US012722681B2

(12) United States Patent
Shibata et al.

(10) Patent No.: US 12,722,681 B2
(45) Date of Patent: Sep. 1, 2026

(54) CHILD CARE EQUIPMENT WITH SEAT

(71) Applicants: GRACO CHILDREN'S PRODUCTS, INC.; NEWELL BRANDS JAPAN G.K., Tokyo (JP)

(72) Inventors: Yuji Shibata, Tokyo (JP); Tomoyuki Honda, Tokyo (JP)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 302 days.

(21) Appl. No.: 18/682,845

(22) PCT Filed: Dec. 19, 2022

(86) PCT No.: PCT/JP2022/046685

§ 371 (c)(1),
(2) Date: Feb. 9, 2024

(87) PCT Pub. No.: WO2023/120482

PCT Pub. Date: Jun. 29, 2023

(65) Prior Publication Data

US 2024/0294204 A1 Sep. 5, 2024

(30) Foreign Application Priority Data

Dec. 24, 2021 (JP) ................................ 2021-210237

(51) Int. Cl.
*B62B 9/10* (2006.01)
*B65H 75/48* (2006.01)

(52) U.S. Cl.
CPC .............. *B62B 9/104* (2013.01); *B65H 75/48* (2013.01)

(58) Field of Classification Search
CPC ...... B62B 9/104; B65H 75/48; B65H 75/4431
See application file for complete search history.

(56) References Cited

U.S. PATENT DOCUMENTS 5,490,685 A * 2/1996 Kitayama .............. B62B 9/104
280/47.38
6,471,222 B1 * 10/2002 Hsia ........................ B62B 9/104
280/658

(Continued)

FOREIGN PATENT DOCUMENTS

CN 206606250 U * 11/2017
CN 208585309 U * 3/2019

(Continued)

OTHER PUBLICATIONS

CN-206606250-U English Translation (Year: 2017).*

(Continued)

*Primary Examiner* — Michael T. Walsh
(74) *Attorney, Agent, or Firm* — Eversheds Sutherland (US) LLP

(57) ABSTRACT

An adjustment mechanism (3) comprising: a holder (30) attached to a back surface of a backrest portion; a reel (80) housed in the holder (30) and supported by the holder (30) so as to be rotatable in both forward and reverse directions; a cord (4) connecting a body and the backrest portion and configured to change the tilt angle of the backrest portion as the reel (80) winds up and lets out the cord; and a lock member (70) housed in the holder (80) and configured not to allow rotation of the reel (80).

9 Claims, 14 Drawing Sheets

(56) References Cited

U.S. PATENT DOCUMENTS

| | | | | |
|---|---|---|---|---|
| 7,275,324 | B2 * | 10/2007 | Proulx | A01D 34/4163 30/276 |
| 2003/0052474 | A1 * | 3/2003 | Yang | B62B 9/104 280/47.4 |
| 2007/0102980 | A1 * | 5/2007 | Chen | B62B 9/104 297/354.12 |

FOREIGN PATENT DOCUMENTS

| | | | | | |
|---|---|---|---|---|---|
| DE | 19835504 | C2 | * | 12/2000 | A01D 34/4163 |
| JP | 03-182870 | A | | 8/1991 | |
| JP | 2003095113 | A | * | 4/2003 | B62B 9/104 |
| JP | 2004-058985 | A | | 2/2004 | |
| KR | 200483360 | Y1 | * | 5/2017 | B62B 9/104 |
| SU | 1692466 | A2 | * | 11/1991 | |
| WO | WO-2021111174 | A1 | * | 6/2021 | B62B 9/104 |

OTHER PUBLICATIONS

WO-2021111174-A1 English Translation (Year: 2021).*
JP-2003095113-A English Translation (Year: 2003).*
CN-208585309-U English Translation (Year: 2019).*
KR-200483360-Y1 English Translation (Year: 2017).*
SU-1692466-A2 English Translation (Year: 1991).*
DE-19835504-C2 English Translation (Year: 2000).*
PCT, "International Search Report and Written Opinion" Application No. PCT/JP2022/046685, mailed Feb. 7, 2023, 9 pages.
PCT, "Extended European Search Report" Application No. PCT/JP2022/046685, mailed May 16, 2025, 8 pages.

* cited by examiner

CHILD CARE EQUIPMENT WITH SEAT

TECHNICAL FIELD

The present invention relates to child care equipment with a seat, and more particularly to child care equipment with a seat that includes: a body including a seat surface portion; a backrest portion standing upward from the rear end of the seat surface portion and having a changeable tilt angle with respect to the seat surface portion; and an adjustment mechanism for changing the tilt angle of the backrest portion.

BACKGROUND ART

Strollers as child care equipment with a seat typically have a backrest portion mounted such that the tilt angle of the backrest portion with respect to a seat surface portion is changeable.

For example, Japanese Unexamined Utility Model Application Publication No. H07-4248 (Patent Literature 1) discloses a stroller having a belt connected to a push bar. The reclining angle can be changed by adjusting the length of the belt by a buckle attached to the back side of a backrest portion.

CITATION LIST

Patent Literatures

Patent Literature 1: Japanese Unexamined Utility Model Application Publication No. H07-4248

SUMMARY OF INVENTION

Technical Problem

The stroller of Patent Literature 1 needs both hands to change the tilt angle of the backrest portion are complicated in structure.

The present invention was made to solve the above problem, and it is an object of the present invention to provide child care equipment with a seat in which the tilt angle of a backrest portion can be changed by a simple structure.

Solution to Problem

In order to achieve the above object, child care equipment with a seat according to one aspect of the invention is child care equipment with a seat that comprising: a body including a seat surface portion; a backrest portion standing upward from a rear end of the seat surface portion and having a changeable tilt angle with respect to the seat surface portion; and an adjustment mechanism configured to change the tilt angle of the backrest portion. The adjustment mechanism includes: a holder attached to a back surface of the backrest portion; a reel housed in the holder and supported by the holder so as to be rotatable in both forward and reverse directions; a cord connecting the body and the backrest portion and configured to change the tilt angle of the backrest portion as the reel winds up and lets out the cord; and a lock member housed in the holder and configured not to allow rotation of the reel.

Preferably, the adjustment mechanism further includes a biasing member configured to bias the reel in a wind-up direction in which the reel winds up the cord.

Preferably, a biasing force of the biasing member is selected to be smaller than a biasing force of the backrest portion trying to move downward.

Preferably, the adjustment mechanism further includes a one-way clutch mechanism configured to allow rotation of the reel in the wind-up direction in which the reel winds up the cord and not to allow rotation of the reel in a unwind direction in which the reel lets out the cord.

Preferably, the lock member includes an engaging pawl that is displaceable between a first position where the lock member is engaged with a portion that rotates with the reel so as not to allow the rotation of the reel and a second position where the lock member is disengaged from the portion that rotates with the reel so as to allow the rotation of the reel.

Preferably, the adjustment mechanism further includes an unlock member configured to bring the lock member to the second position to allow the reel to rotate freely.

Preferably, the unlock member is located so as to protrude from a lateral side surface of the holder.

Preferably, the biasing member is a spiral spring, one end of the spiral spring is fixed to the reel, and the other end of the spiral spring is fixed to the holder.

Preferably, the reel and the lock member are located between the holder and the unlock member, a rotation axis of the reel is perpendicular to the back surface of the backrest portion, the lock member is mounted so as to be displaceable between the first position and the second position in a radial direction of the reel, and the unlock member is mounted so as to be displaceable in a parallel relationship to the back surface of the backrest portion.

Preferably, the holder includes an inner plate portion extending along the back surface of the backrest portion, the unlock member includes an outer plate portion extending in a parallel relationship to the inner plate portion, and the reel and the lock member are located between the inner plate portion and the outer plate portion.

Preferably, the lock member is mounted so as to be displaceable within a thickness of the reel.

Preferably, the holder has a flat shape elongated in an up-down direction and extending along the back surface of the backrest portion, and has a through hole for passing the cord therethrough, the through hole is located at a lower position in the holder elongated in the up-down direction, and the unlock member has a shape elongated in the up-down direction and extending along the back surface of the backrest portion, and includes an operation portion located at an upper position in the unlock member.

Child care equipment with a seat according to another aspect of the invention is child care equipment with a seat that comprising: a body including a seat surface portion; a backrest portion standing upward from a rear end of the seat surface portion and having a changeable tilt angle with respect to the seat surface portion; and an adjustment mechanism configured to change the tilt angle of the backrest portion. The adjustment mechanism includes: a cord connecting the body and the backrest portion; a reel configured to be rotatable in both forward and reverse directions and to change the tilt angle of the backrest portion by winding up and letting out the cord; a biasing member configured to bias the reel in a wind-up direction in which the reel winds up the cord; and a lock member configured not to allow rotation of the reel, and a biasing force of the biasing member is selected to be smaller than a biasing force of the backrest portion trying to move downward.

Advantageous Effects of Invention

According to the present invention, it is possible to provide child care equipment with a seat in which the tilt angle of a backrest portion can be changed by a simple structure.

BRIEF DESCRIPTION OF DRAWINGS

FIG. 1(A) illustrates a backrest portion in a raised state, and FIG. 1(B) illustrates the backrest portion in a tilted state.

FIG. 2(A) illustrates a backrest portion in a raised state, and FIG. 2(B) shows the backrest portion in a tilted state.

FIG. 3(A) is a perspective view and FIG. 3(B) is a plan view.

FIG. 5(A) illustrates the state in which an unlock member is not operated, and FIG. 5(B) illustrates the state in which the unlock member is operated.

FIG. 6(A) is a perspective view, FIG. 6(B) is a plan view, and FIG. 6(C) is a front view.

FIG. 7(A) illustrates the state in which an unlock member is not operated, and FIG. 7(B) illustrates the state in which the unlock member is operated.

FIG. 9(A) illustrates the state in which an unlock member is not operated, and FIG. 9(B) shows the state in which the unlock member is operated.

FIG. 10(A) illustrates a backrest portion in a raised state, and FIG. 10(B) illustrates the backrest portion in a reclined state.

FIG. 11(A) is a plan view and FIG. 11(B) is a side view.

FIG. 14(A) shows the state in which the unlock member is not operated, and FIG. 14(B) shows the state in which the unlock member is operated.

DESCRIPTION OF EMBODIMENTS

Figure 1:
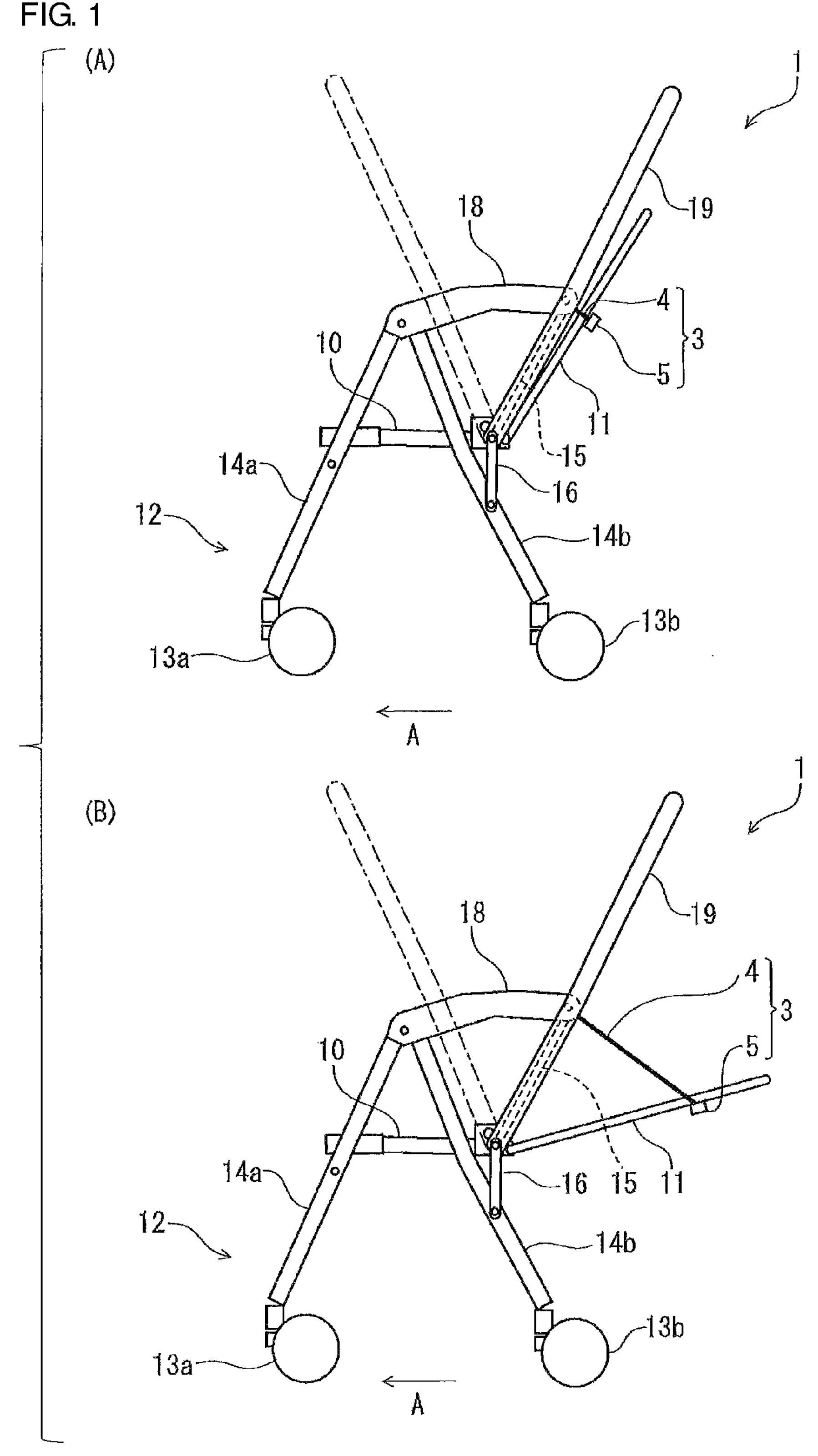
FIG. 1 shows side views illustrating a framework of a stroller according to an embodiment of the present invention, where

Embodiments of the present invention will be described in detail with reference to the accompanying drawings. In the drawings, the same or corresponding parts are denoted with the same reference characters, and description thereof will not be repeated.

First, an example of child care equipment with a seat that includes an adjustment mechanism 3 will be described. Although examples of the child care equipment with a seat that uses the adjustment mechanism 3 include a stroller, a car seat, a bassinet, and a highchair, an example in which the present invention is applied to a stroller will be described below.

(Overview of Stroller)

An example of a stroller 1 will be described with reference to FIGS. 1 and 2. In the description of the stroller 1, the forward direction is the direction shown by arrow A, and the rearward direction is the opposite direction thereto. The left-right direction (lateral direction) is the left-right direction as viewed from the front of the stroller 1, and the up-down direction is a direction extending along a height of the stroller 1.

For example, a vehicle body frame of the stroller 1 may be of a so-called reversible type that can be switched between the forward-facing mode and the rearward-facing mode as shown in FIG. 1, and may be foldable. Alternatively, the vehicle body frame of the stroller 1 may be of a non-reversible type that can only be in the forward-facing mode as shown in FIG. 2, and may be non-foldable. However, the vehicle body frame of the stroller 1 is not particularly limited to these.

The structure of the stroller 1 shown in FIG. 1 will be described. Components of a stroller 1A shown in FIG. 2 are denoted with the same reference characters as those of the stroller 1, and description thereof will not be repeated. The basic structure of the stroller 1 may be similar to that of a common stroller. The stroller 1 includes a seat surface portion 10, a backrest portion 11, a leg portion 12, a connecting bar 15, a reversal bracket 16, a front guard 17, an armrest portion 18, and a push bar 19. The components of the vehicle body frame other than the seat surface portion 10, the backrest portion 11, the front guard 17 (shown in FIG. 2), and the push bar 19 are provided in pairs on the right and left sides such that the components of each pair are spaced apart from each other in the lateral direction (vehicle width direction).

The seat surface portion 20 is a portion that supports the buttocks of a child. The backrest portion 11 is a portion standing upward from the rear end of the seat surface portion 20 to support the back of the child. The seat surface portion 10 and the backrest portion 11 form a receiving space for receiving the child. The backrest portion 11 is mounted such that its tilt angle with respect to the seat surface portion 10 is changeable. FIGS. 1(A) and 2(A) shows a chair mode with the backrest portion 11 raised with respect to the seat surface portion 10, and FIGS. 1(B) and 2(B) shows a bed mode with the backrest portion 11 tilted (reclined) with respect to the seat surface portion 10.

The adjustment mechanism 3 is mounted on the back side (back surface) of the backrest portion 11 in order to change the tilt angle of the backrest portion 11.

The adjustment mechanism 3 generally includes a cord 4 and an adjustment mechanism body 5. The tilt angle of the backrest portion 11 can be changed by adjusting the length of the cord 4 by the adjustment mechanism body 5. The backrest portion 11 is raised by winding up the cord 4 by the adjustment mechanism body 5 as shown in FIGS. 1(A) and 2(A), and the backrest portion 11 is reclined by letting out the cord 4 by the adjustment mechanism body 5 as shown in FIGS. 1(B) and 2(B). The configuration of the adjustment mechanism 3 will be described later.

The leg portions 12 support the seat surface portion 10 from below. The leg portions 12 include a pair of front legs 14*a* each having a front wheel 13*a*, and a pair of rear legs 14*b* each having a rear wheel 13*b*. The pair of front legs 14*a* and the pair of rear legs 14*b* are connected at their upper ends. The front guard 17 (shown in FIG. 2) extends in the lateral direction at a position forward of the seat surface portion 10, and may be detachably connected to the front ends of the pair of armrest portions 18 disposed on the right and left sides of the seat surface portion 10. The front guard 17 may be connected to both lateral ends (corners intersecting with the backrest portion 11) of the rear end portion of the seat surface portion 10.

The front ends of the armrest portions 18 are connected to the upper ends of both the pair of front legs 14*a* and the pair of rear legs 14*b*. The rear ends of the armrest portions 18 are connected to the upper ends of the connecting bars 15 extending in the up-down direction. The lower ends of the connecting bars 15 are connected to the upper ends of the reversal brackets 16 and the rear end of the seat surface portion 10. As shown in FIGS. 1(A) and 1(B), when the vehicle body frame is viewed from the side, the connecting bars 15 and the push bar 19 overlap each other, and the connecting bars 15 are not visible from the side. The lower ends of the reversal brackets 16 are connected to intermediate positions in the up-down direction of the rear legs 14*b*.

The lower end portion of each connecting bar 15 is switchable between a position where the connecting bar 15 is locked to the rear leg 14*b* and a position where the connecting bar 15 is unlocked from the rear leg 14*b*. The position where the connecting bar 15 is locked to the rear leg 14*b* corresponds to the stroller 1 being in a traveling state, and is a position where the lower end portion of the connecting bar 15 is in contact with the middle portion of the rear leg 14*b*. The position where the connecting bar 15 is unlocked from the rear leg 14*b* corresponds to the stroller 1 being in a folded state, and is a position where the lower end portion of the connecting bar 15 is in contact with the lower end portion of the rear leg 14*b* as a result of the reversal bracket 16 being rotated reversely and the upper end of the reverse bracket 16 being rotated and moved downward. The stroller 1 is made foldable by this configuration.

The push bar 19 extends in the up-down direction and is connected to the rear end of the seat surface portion 10. The push bar 19 is mounted so as to be swingable in the front-rear direction with respect to the seat surface portion 10 and the backrest portion 11, and is switchable between a rearward-facing position shown by a long dashed short dashed line and a forward-facing position shown by a solid line.

In the present embodiment, the body includes the seat surface portion 10. However, the body may include not only the seat surface portion 10 but also the members other than the backrest portion 11, such as the leg portions 12, the connecting bars 15, the reversal brackets 16, the front guard 17, the armrest portions 18, and the push bar 19.

First Embodiment

Figure 3:
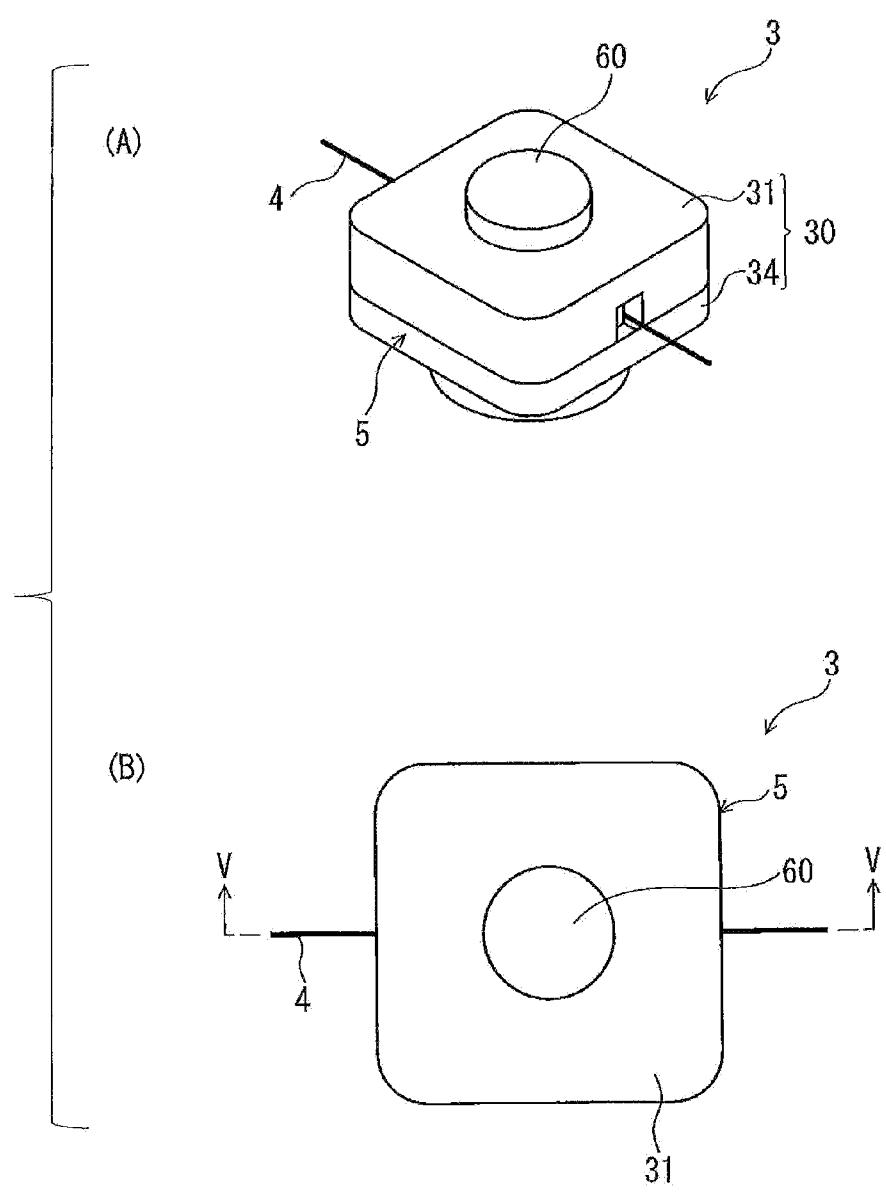
FIG. 3 illustrates an adjustment mechanism according to a first embodiment of the present invention, where

The adjustment mechanism 3 according to a first embodiment will be described with reference to FIGS. 3 to 5. In the following description of the adjustment mechanism 3, the up-down direction in FIGS. 4 and 5 corresponds to the up-down direction of the adjustment mechanism 3, and the left-right direction in FIGS. 4 and 5 corresponds to the left-right direction of the adjustment mechanism 3.

As described above, the adjustment mechanism 3 generally includes the cord 4 and the adjustment mechanism body 5. Referring particularly to FIGS. 4 and 5, the adjustment mechanism body 5 includes a holder 30, an unlock member 60, a lock member 70, a reel 80, and a biasing member 110. The adjustment mechanism 3 can automatically wind up the cord 4 by the biasing force of the biasing member 100. The cord 4 thus wound up can be pulled out (let out) when the unlock member 60 is operated.

Figure 2:
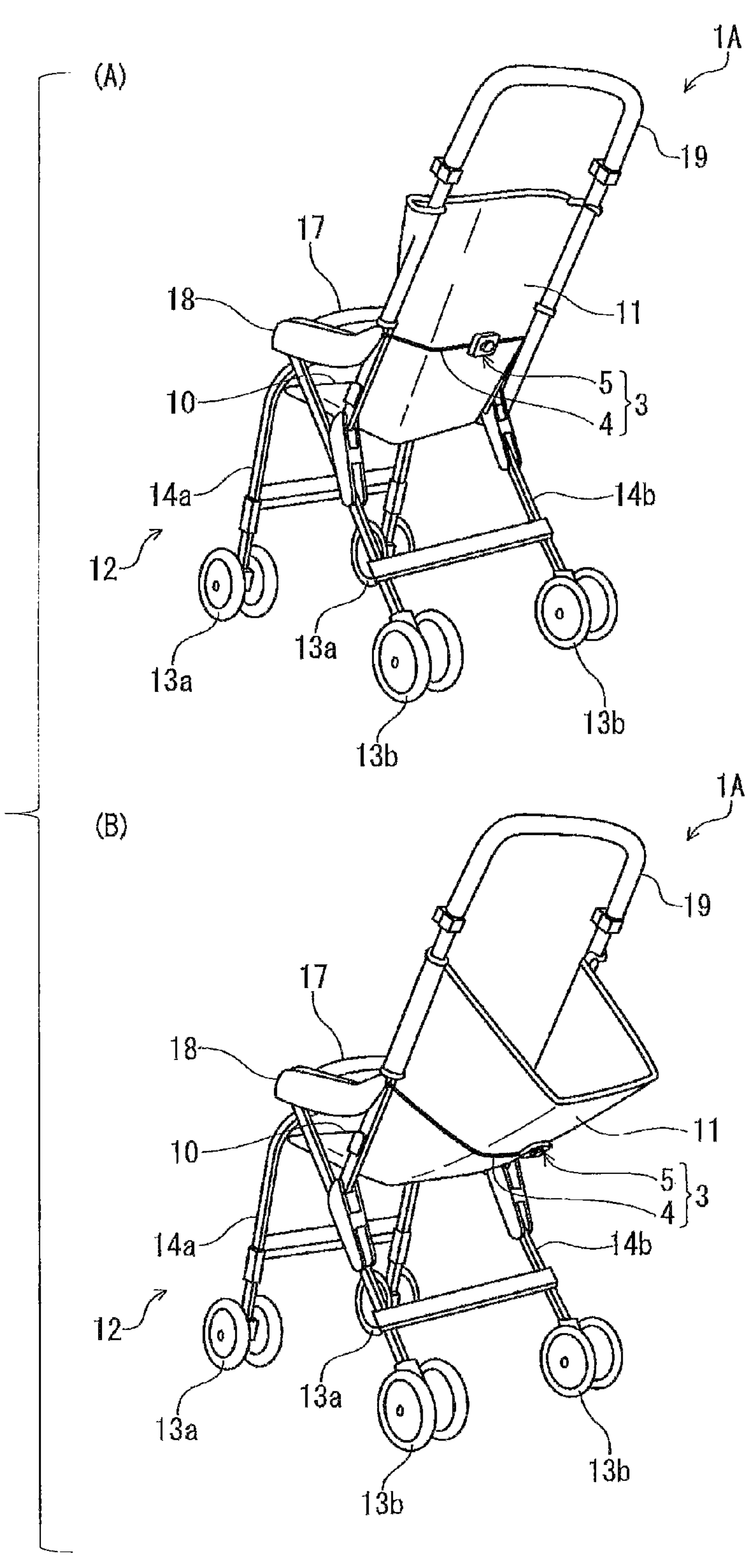
FIG. 2 shows perspective views of another stroller according to the embodiment of the present invention as viewed from the back, where

As shown in FIG. 2, the cord 4 connects the rear end portions of the armrest portions 18 and the backrest portion 11. The cord 4 is wound up by the reel 80 and is fixed to the backrest portion 11 via the reel 80. One cord 4 may be provided, and two or more cords 4 may be provided. Specifically, both ends of one cord may be connected to the rear ends of the armrest portions 18 with the middle portion of the cord fixed to the reel, or two cords may be provided, with their one ends connected to the rear ends of the armrest portions 18 and the other ends fixed to the reel 80.

The tilt angle of the backrest portion 11 can be changed by adjusting the wind-up length of the cord 4. Specifically, the stroller 1 can be switched to the chair mode as shown in FIGS. 1(A) and 2(A) by winding up (tightening) the cord 4 by the reel 80, and can be switched to the bed mode as shown in FIGS. 1(B) and 2(B) by letting out (loosening) the cord 4.

In the present embodiment, the cord 4 means an elongated member composed of threads, chemical fibers, metal, paper, etc. braided, weaved, or sewed together, and includes, for example, a wire, a belt, etc. The cord 4 is herein connected to the rear end portions of the armrest portions 18. However, the cord 4 may be connected to a member other than the backrest portion 11, such as the push bar 19 or the seat surface portion 10. The location to which the cord 4 is connected is not limited.

Figure 4:
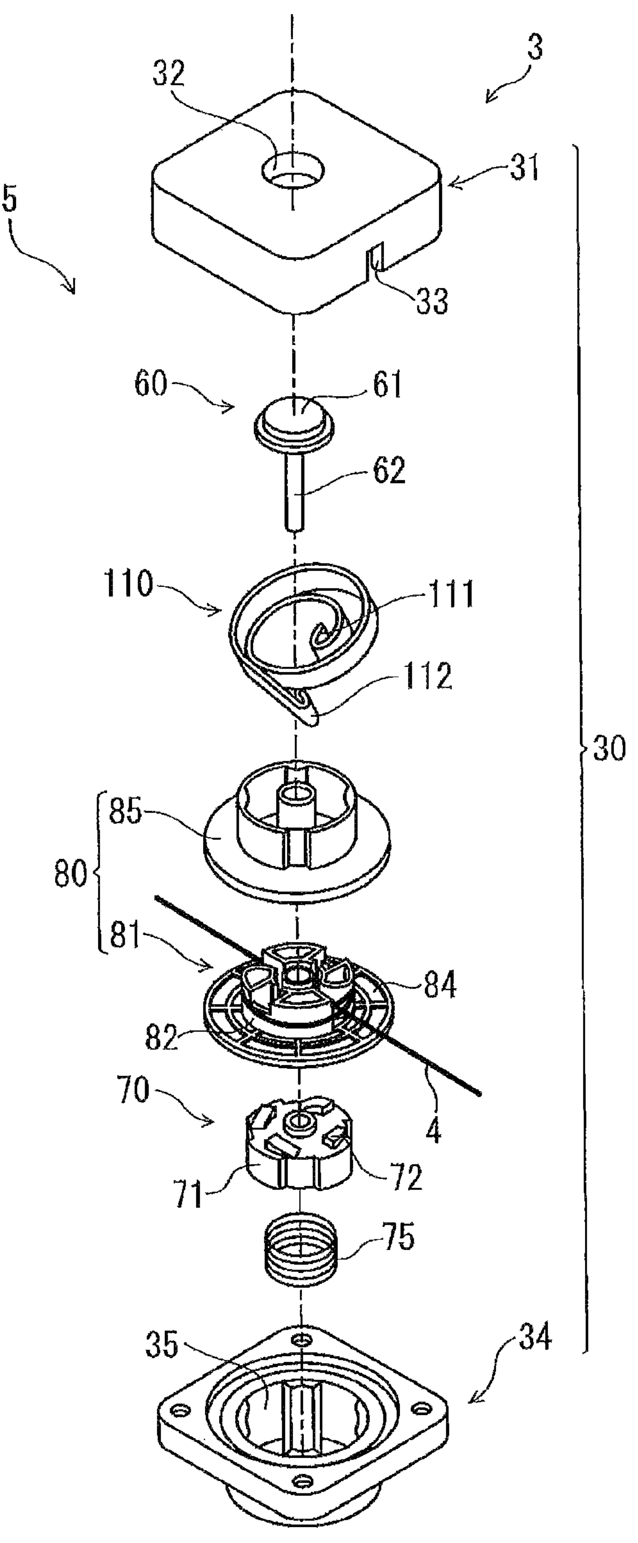
FIG. 4 is an exploded perspective view of the adjustment mechanism according to the first embodiment of the present invention.
Figure 5:
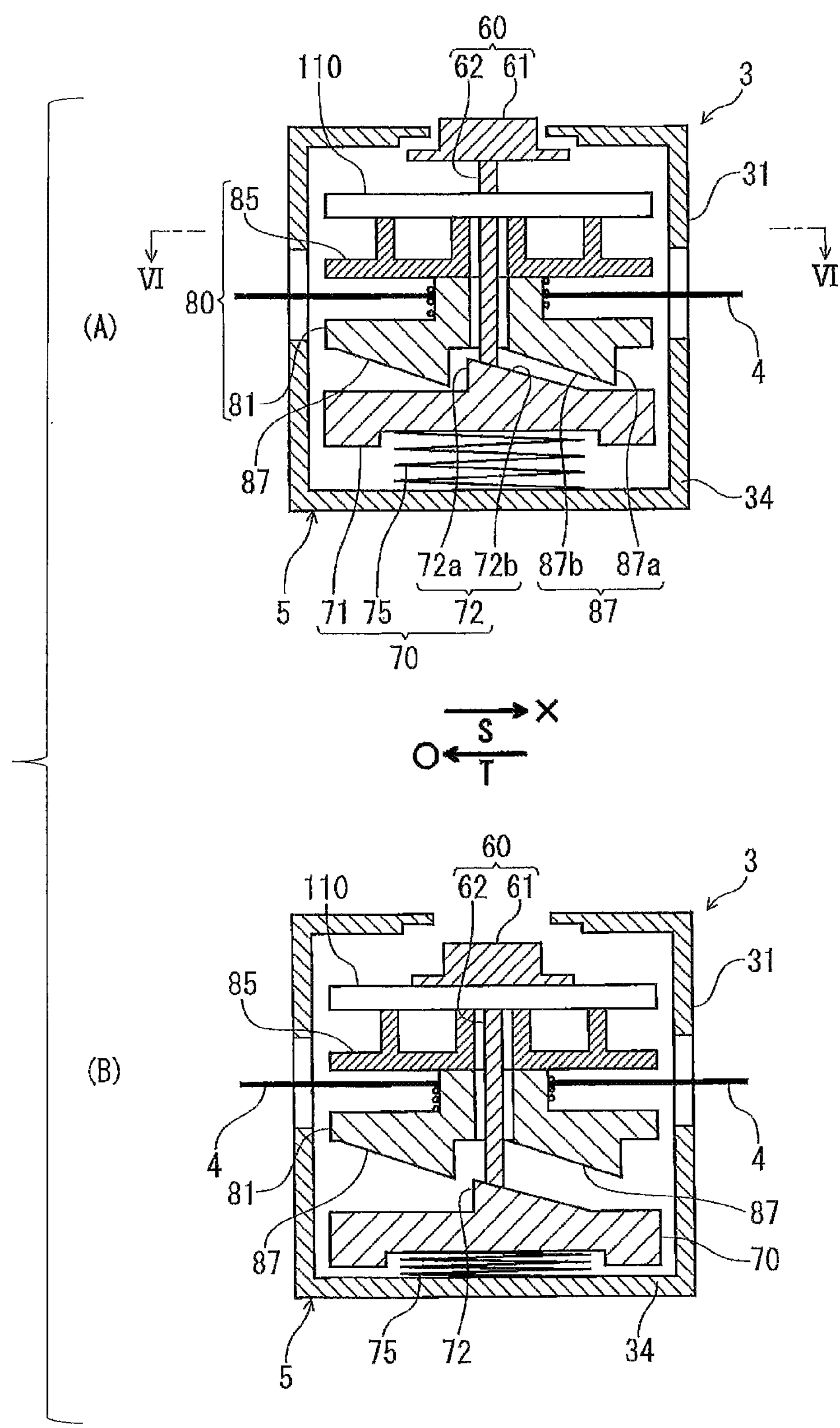
FIG. 5 shows sectional views taken along line V in FIG. 3, where

Referring to FIGS. 4 and 5, the holder 30 rotatably supports the reel 80. The holder 30 includes an upper holder 31 and a lower holder 34. The upper holder 31 includes an upper surface and side surfaces protruding downward from the outer peripheral edge of the upper surface. The upper holder 30 has a through hole 32 substantially in the center of the upper surface. An operation portion 61 of the unlock member 60 extends through the through hole 32. The upper holder 31 further has cord holes 33 in its opposing side surfaces.

The lower holder 34 includes a lower surface and side surfaces protruding upward from the outer peripheral edge of the lower surface. A recessed portion 35 for holding the lock member 70 is located in the region surrounded by the lower surface and the side surfaces. Since the lower surface of the lower holder 34 is fixed to the backrest portion 1, the upper surface of the upper holder 31 is located so as to face the rearward direction of the stroller 1 as shown in FIG. 2.

The biasing member 110 biases the reel 80 so that the reel 80 rotates in a wind-up direction in which the reel 80 winds up the cord 4. The biasing force of the biasing member 110 is selected to be smaller than the biasing force of the backrest portion 11 trying to move downward. The biasing member 110 is, for example, a spiral spring. The spiral spring is in the form of a spiral, and includes one end portion 111 located radially inside and the other end portion 112 located radially outside. Although not shown in the figures, the one end portion 111 of the spiral spring is fixed to the reel 80, and the other end portion 112 thereof is fixed to the upper holder 31. The reel 80 is thus always biased in the wind-up direction.

In the present embodiment, the spiral spring is used as the biasing member 110. However, the biasing member 110 may be any member that biases the reel 80 so that the reel 80 rotates in the wind-up direction in which the reel 80 winds up the cord 4. The biasing member 110 may be a different type of spring, or a different type of biasing member that applies an elastic biasing force may be used.

The reel 80 is rotatable in both forward and reverse directions (one direction and the other direction). The reel 80 can change the tilt angle of the backrest portion 11 by winding up and letting out the cord 4. Referring to FIGS. 4 and 5, the reel 80 includes a reel body 81 and a link member 85 located on top of the reel body 81 and rotates with the reel body 81.

The reel body 81 includes a cord holding portion 82 and a flange 84 located under the cord holding portion 82. The cord holding portion 82 is a portion to which the cord 4 is fixed, and is a portion on which the cord 4 is to be wound up and from which the cord is to be let out. The cord holding portion 82 has a hole through which an unlock body 62 of the unlock member 60, which will be described later, extends through. As shown in FIG. 5, the flange 84 extends in a direction perpendicular to the rotation axis of the reel 80. The flange 84 has engaging teeth 87 formed successively in the circumferential direction on its lower side. The engaging teeth 87 engage with engaging pawls 72 of the lock member 70 that will be described later.

The link member 85 also has substantially in its center a through hole through which the unlock body 62, which will be described later, extends. The one end portion 111 of the biasing member 110 is fixed to the link member 85, so that when the link member 85 is rotated by the biasing member 110, the reel 80 also rotates together. The link member 85 need not necessarily be provided. When the link member 85 is not provided, the one end portion 111 of the biasing member 110 is attached to the reel body 81.

The lock member 70 does not allow rotation of the reel 80. The lock member 70 is located under the reel 80, and is mounted so as to be displaceable in the up-down direction. As shown in FIGS. 4 and 5, the lock member 70 includes a lock body 71, the engaging pawls 72 formed on the upper surface of the lock body 71, and a spring member 75 that biases the lock body 71. The engaging pawls 72 are displaceable between a first position where the engaging pawls 72 engage with the reel 80 so as not to allow rotation of the reel 80 and a second position where the engaging pawls 72 are separated from the reel 80 to allow rotation of the reel 80. Specifically, the lock member 70 is displaceable between an engaging position where the engaging pawls 82 engage with the engaging teeth 87 (first position: FIG. 5(A)) and a non-engaging position where the engaging pawls 82 do not engage with the engaging teeth 87 (second position: FIG. 5(B)). As described above, the engaging teeth 87 are formed on a lower surface extending in the direction perpendicular to the rotation axis of the reel 80. The engaging pawls 72 of the lock member 70 and the engaging teeth 87 of the reel 80 are a “rotation lock mechanism” that does not allow rotation of the reel 80.

In the present embodiment, the engaging pawls 72 engage with the engaging teeth 87 of the reel 80. However, in the case where a member that rotates with the reel 80 is provided, the engaging pawls 72 may engage with engaging teeth of that member.

The unlock member 60 brings the lock member 70 to the non-engaging position (second position: FIG. 5(B)). Specifically, the unlock member 60 releases the reel 80 from the state in which the reel 80 is not allowed to rotate, and thus allows the reel 80 to rotate freely. That is, by operating the unlock member 60, it becomes possible to pull out the cord 4 from the reel 80, and it also becomes possible for the reel 80 to automatically wind up the cord 4 by the biasing member 110. FIG. 5(A) illustrates the state in which the unlock member 60 is not operated, namely the state in which the reel 80 cannot let out the cord 4. FIG. 5(B) illustrates the state in which the unlock member 60 is operated, namely the state in which the reel 80 can wind up and let out the cord 4. The unlock member 60 moves in a direction parallel to the rotation axis of the reel 80 to release the reel 80 from the state in which the reel 80 is not allowed to rotate.

Referring to these figures, the unlock member 60 includes the operation portion 61 that is operated by a user, and the unlock body 62 that is in the form of a rod extending in the up-down direction and slides in the up-down direction as the operation portion 61 is operated. The unlock member 60 is in contact with the upper part of the lock member 70. The unlock member 60 is therefore always biased toward an unlock position (upward) by the spring member 75.

(One-Way Clutch Mechanism)

A one-way clutch mechanism will be described with reference to FIG. 5. The one-way clutch mechanism allows the reel 80 to rotate in the wind-up direction in which the reel 80 winds up the cord 4, but does not allow the reel 80 to rotate in an unwind direction in which the reel 80 lets out the cord. The one-way clutch mechanism is a mechanism that easily rotates in one direction but does not rotate in the other direction or does not rotate unless a certain load is applied thereto. In the present embodiment, in FIG. 5(A), the reel 80 rotates in a wind-up direction T in which the reel 80 winds up the cord 4, but does not rotate in an unwind direction S. The one-way clutch mechanism of the present embodiment operates by the rock member 70 moving in the direction parallel to the rotation axis of the reel 80.

In the present embodiment, the one-way clutch mechanism operates by engagement between the engaging teeth 87 of the reel 80 and the engaging pawls 72 of the lock member 70. Each engaging tooth 87 of the reel 80 includes a first tilted portion 87*a* and a second tilted portion 87*b*. Each engaging pawl 72 of the lock member 70 includes a first tilted portion 72*a* and a second tilted portion 72*b*. The first tilted portions 87*a*, 72*a* that face each other in the unwind direction S preferably extend in the direction parallel to the rotation axis of the reel 80. The engaging teeth 87 of the reel 80 and the engaging pawls 72 of the lock member 70 are not limited to the shapes shown in the figures, and may have any shapes such as the shapes in a typical one-way clutch as long as they mesh with each other.

Due to the presence of the one-way clutch mechanism of the present embodiment, the reel 80 rotates only in the wind-up direction T and does not rotate in the unwind direction S. The rotation in the direction in which the cord 4 is let out cannot occur unless the unlock member 60 is operated. This configuration can increase the strength of even the backrest portion 11 to which the load from a child is applied. Therefore, the backrest portion 11 will not suddenly fall backward, and the safety is improved.

(Operation)

The operation of the adjustment mechanism 3 of the first embodiment will be described. In order to raise the backrest portion 11, the backrest portion 11 is pushed up and raised. Since the reel 80 is biased in the wind-up direction by the biasing member 110, the cord 4 loosened as the backrest portion 11 is pushed up is wound up by the reel 80. Once the loosened cord 4 is wound up by the reel 80, the hand is released from the backrest portion 11. Since the biasing force of the biasing member 110 biasing the reel 80 in the wind-up direction is smaller than the biasing force of the backrest portion 11 trying to move downward, the wind-up operation of the reel 80 is stopped when the hand is released. The backrest portion 11 can thus be held in the raised state as shown in FIGS. 1(A) and 2(A).

In order to change the backrest portion 11 from the raised state to a reclined state, the backrest portion 11 is pushed down while pressing the lock member 60. In this case, since the reel 80 is biased in the wind-up direction by the biasing member 110, it is necessary to push down the backrest portion 11 with a force greater than the biasing force of the biasing member 110. However, since the biasing force of the biasing member 110 is set to be smaller than the biasing force of the backrest portion 11 trying to move downward, it is not necessary to push down the backrest portion 11 so hard.

In the present embodiment, the reel 80 is biased in the wind-up direction by the biasing member 110, and the biasing force of the biasing member 110 is set to be smaller than the biasing force of the backrest portion 11 trying to move downward. Therefore, an operator need only raise the backrest portion 11 in order to obtain a desired tilt angle, because the cord 4 is automatically wound up. Accordingly, the operator does not need to wind up the cord 4 after raising the backrest portion 11, which provides high operability.

Moreover, when changing the backrest portion 11 from the raised state to the reclined state, the operator can effortlessly change the backrest portion 11 to the reclined state because the biasing force of the biasing member 110 is set to be smaller than the biasing force of the backrest portion 11 trying to move downward. This also provides high operability. As described above, with the use of the adjustment mechanism of the present embodiment, the tilt angle of the backrest portion 11 can be easily changed with a simple structure.

Second Embodiment

Figure 6:
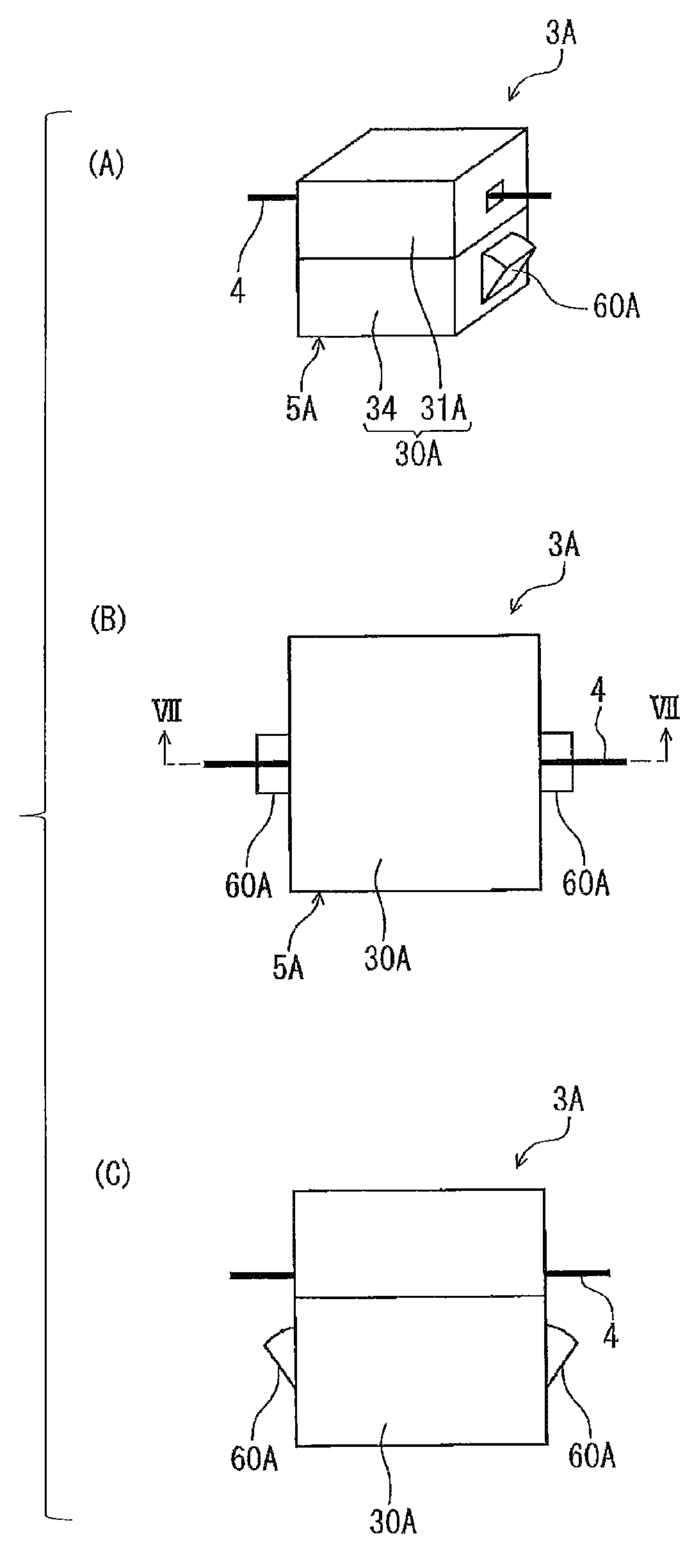
FIG. 6 illustrates an adjustment mechanism according to a second embodiment, where

An adjustment mechanism 3A according to a second embodiment will be described with reference to FIGS. 6 to 8. Only differences from the adjustment mechanism 3 illustrated in the first embodiment will be described in detail. The first embodiment and the present embodiment are generally different from each other in unlock members 60A. In the following description, the upper side of FIGS. 6(C) and 7 is the upper side of the adjustment mechanism 3A, and the lower side of FIGS. 6(C) and 7 is the lower side of the adjustment mechanism 3A.

The adjustment mechanism 3A generally includes the cord 4 and an adjustment mechanism body 5A. Referring particularly to FIG. 7, the adjustment mechanism body 5A includes a holder 30A, the unlock members 60A, a lock member 70A, a reel 80A, and the biasing member 110.

As in the above embodiment, the holder 30A is divided into upper and lower parts, and includes the upper holder 31A and the lower holder 34. As shown in FIG. 7, the upper holder 31 has a protruding portion 32A (FIG. 7) protruding downward inside the upper holder 31A. The reel 80A has at its upper end a protrusion 86A protruding upward. As shown particularly in FIG. 8, the other end portion 112 of the biasing member 110 is connected to the protruding portion 32A of the upper holder 31A, and the one end portion 111 of the biasing member 110 is connected to the protrusion 86A of the reel 80A. The reel 80A is thus biased in the wind-up direction by the biasing member 110.

Figure 7:
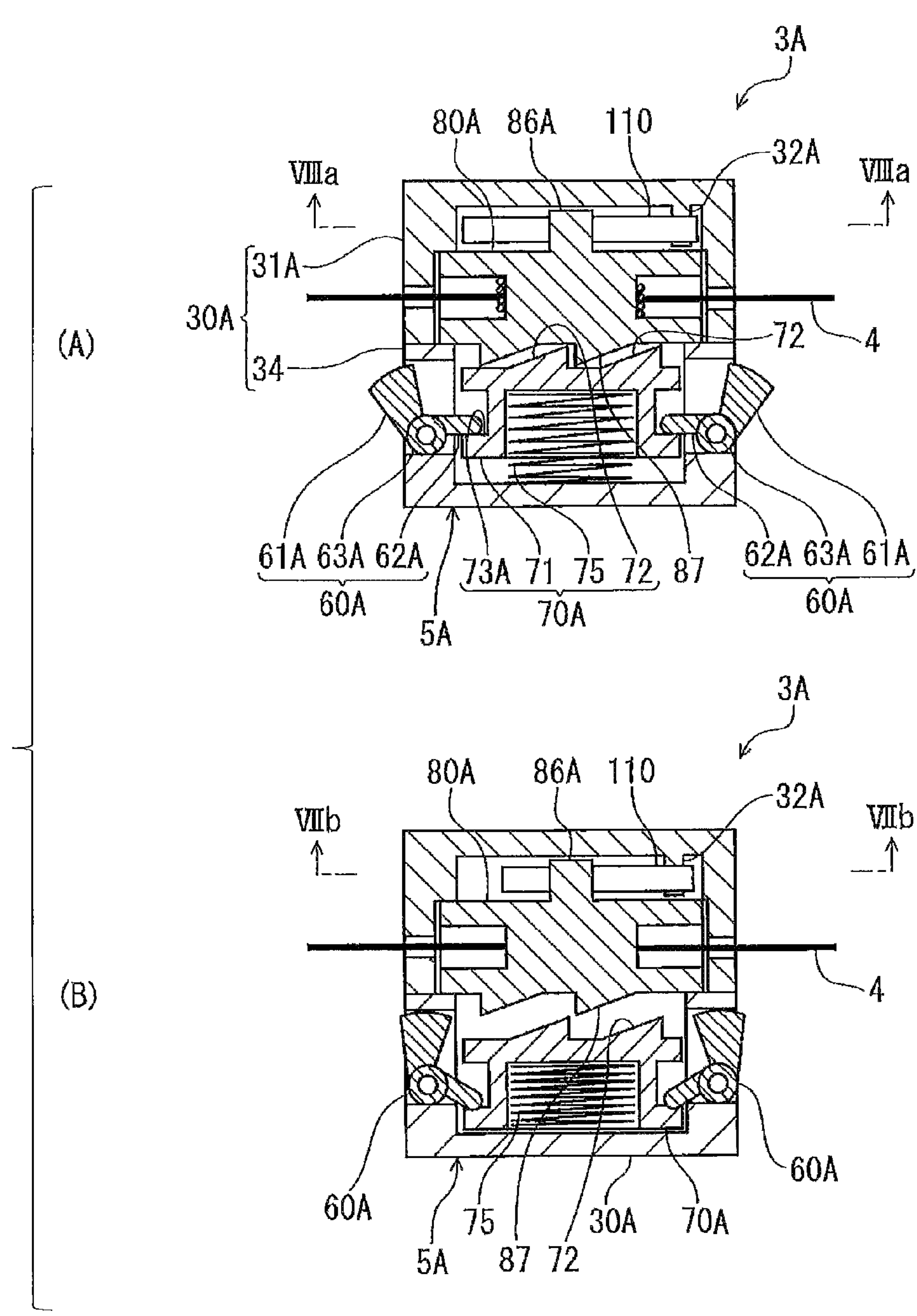
FIG. 7 shows sectional views taken along line VII in FIG. 6, where
Figure 8:
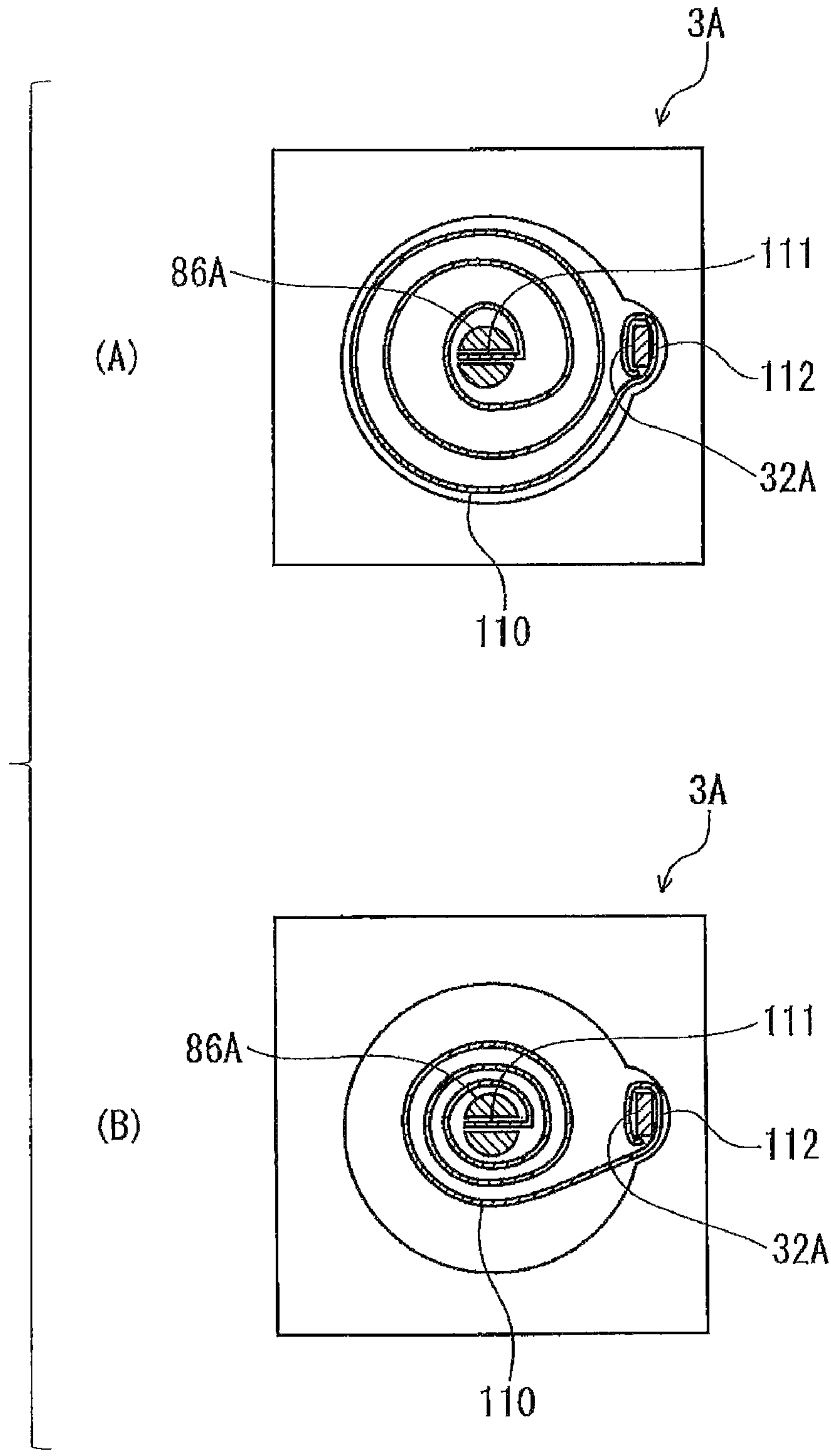
FIG. 8(A) is a sectional view taken along line VIIIa in FIG. 7.
FIG. 8(B) is a sectional view taken along line VIIIb in FIG. 7.

As shown in FIG. 7, the lock member 70A includes the lock body 71, the engaging pawls 72 formed on the upper surface of the lock body 71, a stepped portion 73A formed in the lower part of the lock body 71, and the spring member 75 that biases the lock body 71. Unlock bodies 62A of the unlock members 60A that will be described later are in contact with the stepped portion 73A.

As shown in FIGS. 6 and 7, a pair of unlock members 60A is provided so as to protrude from the lateral side surfaces of the holder 30A. Both lateral side surfaces of the holder 30A match the lateral direction of the stroller 1. That is, the unlock members 60A are disposed at such positions that they face toward the right and left ends of the stroller 1. This allows the user to operate the unlock members 60A with one hand, which improves operability. In the case where a pair of unlock members 60A is provided, the unlock members 60A may be disposed on both surfaces of the holder 30A that face toward the up-down direction.

As shown in FIG. 7, each unlock member 60A includes an operation portion 61A that is operated by the user, the unlock body 62A is rotated and moved by the operation of the operation portion 61A, and a shaft portion 63A connecting the operation portion 61A and the unlock body 62A. When the operation portions 61A in the state shown in FIG. 7(A) are pressed, the unlock bodies 62A pushes down the lock member 70 against the biasing force of the spring member 75, as shown in FIG. 7(B). The reel 80A and the lock member 70 are thus disengaged from each other.

In the adjustment mechanism 3A of the present embodiment, the operation portions 61A of the unlock members 60A protrude from both lateral side surfaces of the holder 30A. Therefore, the backrest portion 11 can be raised or reclined with the operation portions 61A pressed with a thumb and index finger, which provides high operability.

Modification

Figure 9:
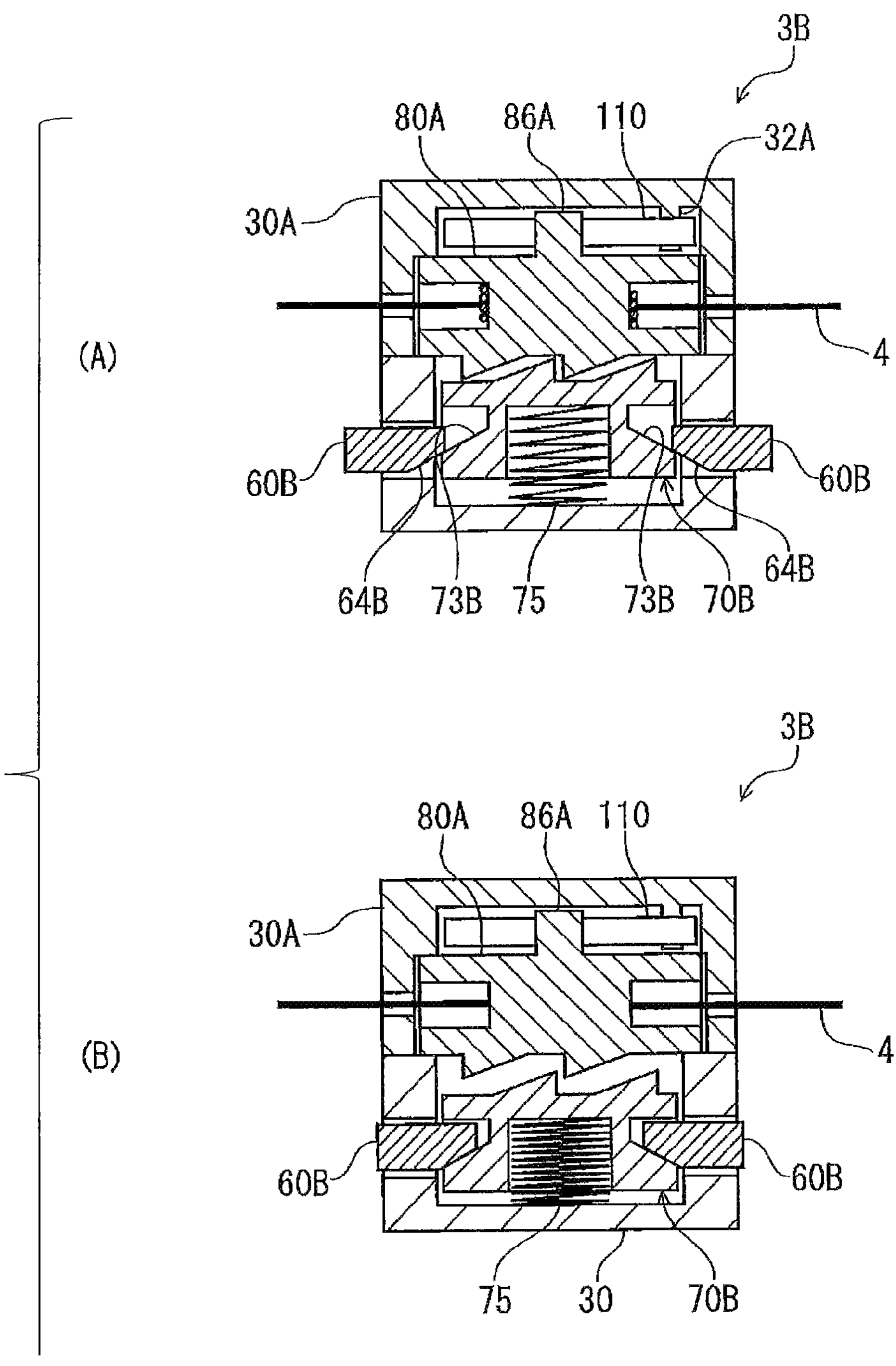
FIG. 9 illustrates a modification of the adjustment mechanism, where
Figure 10:
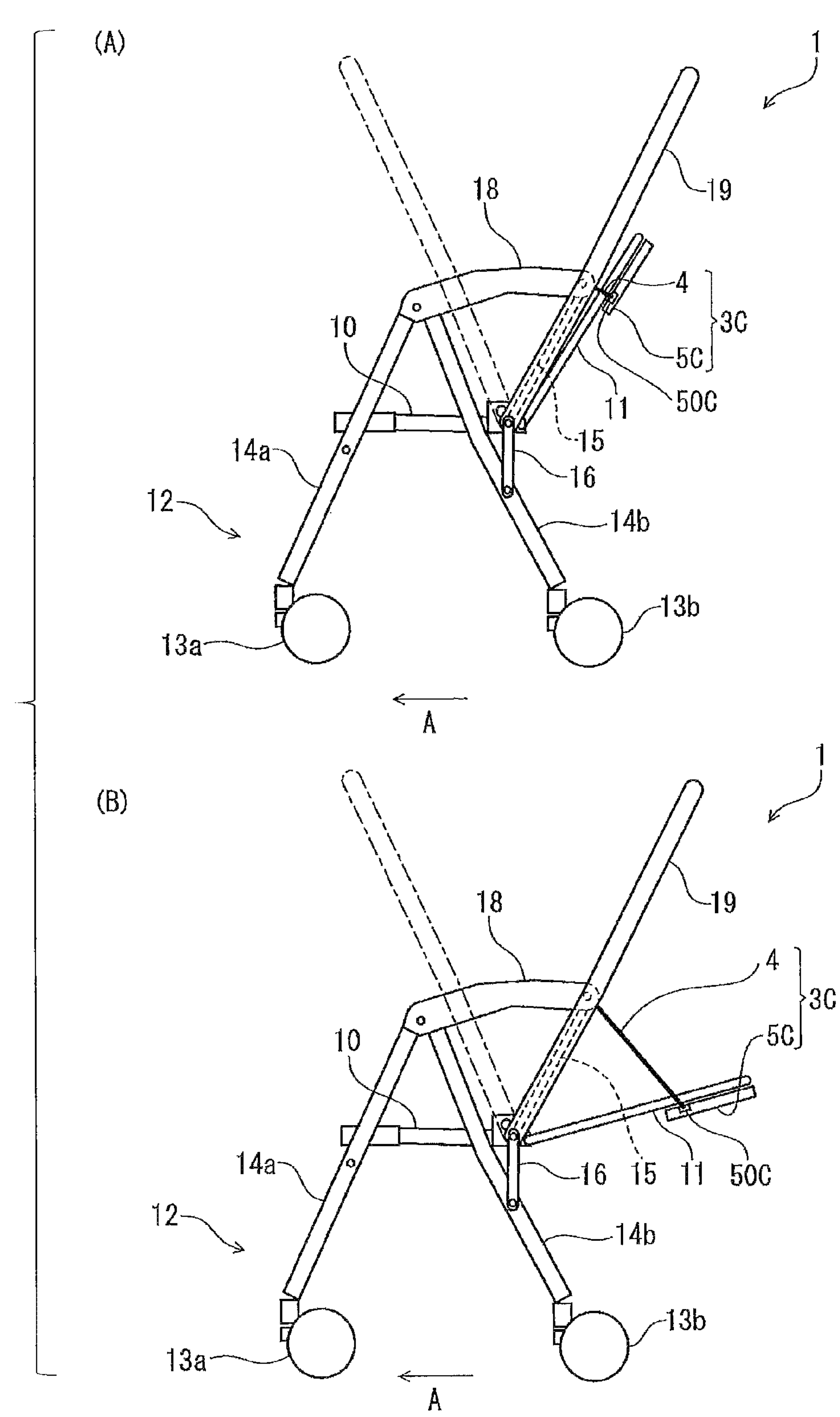
FIG. 10 shows side views illustrating a framework of a stroller according to a third embodiment of the present invention, where

A modification of the unlock members 60A according to the second embodiment will be described with reference to FIG. 9.

A pair of unlock members 60B of an adjustment mechanism 3B is provided so as to protrude from the lateral side surfaces of the holder 30A. The unlock members 60B are movable in a direction perpendicular to the rotation axis of the reel 80. Specifically, each unlock member 60B has a cut portion in its surface that contacts a lock member 70B such that the portion with the cut portion is tapered upward. When the unlock members 60B are pressed inward, the portions with the cut portion slide onto a tilted portion of the lock member 70B, so that the lock member 70B is pushed down against the biasing force of the spring member 75. The reel 80A and the lock member 70B are thus disengaged from each other.

Third Embodiment

Figure 12:
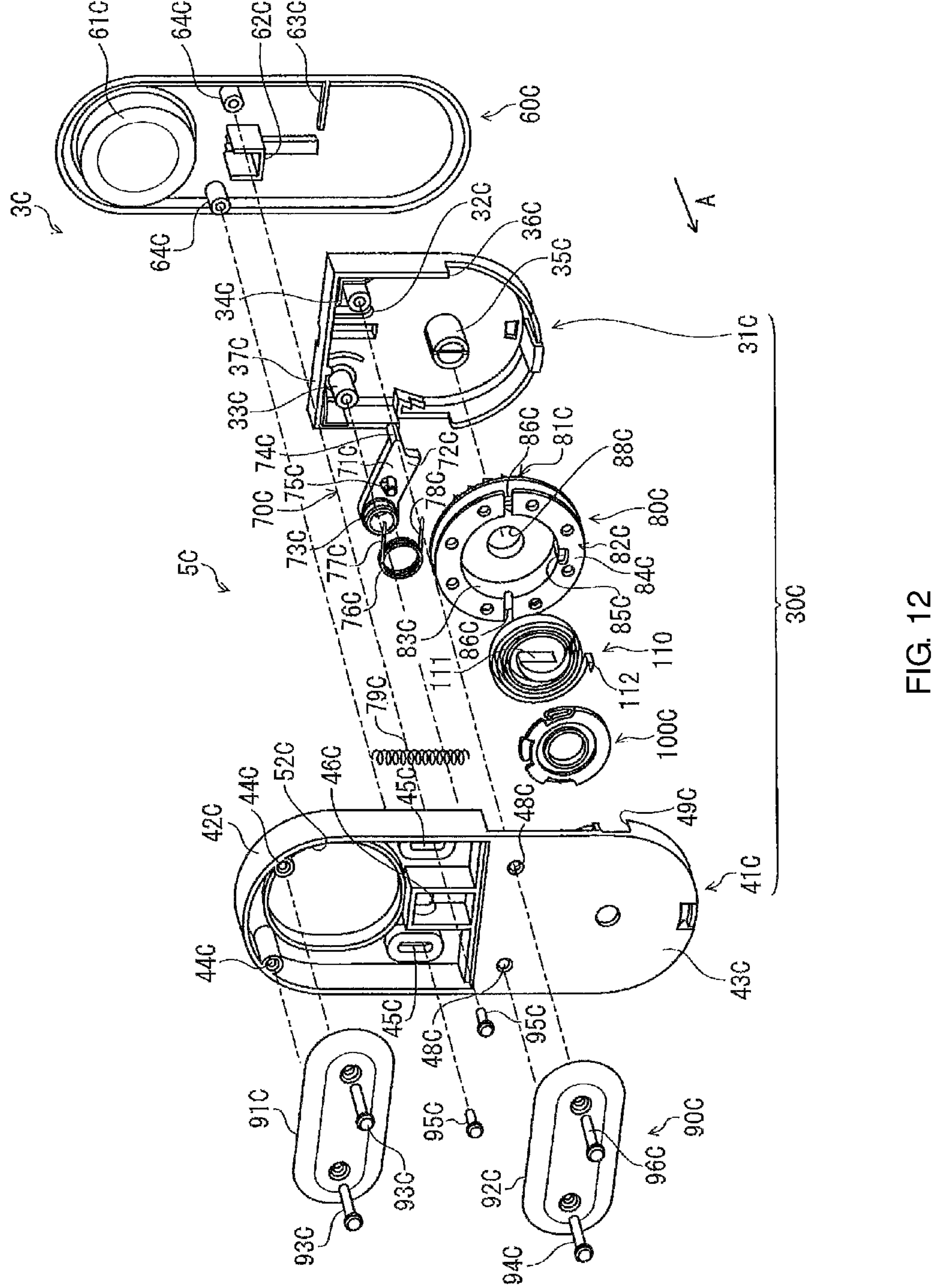
FIG. 12 is an exploded perspective view of the adjustment mechanism according to the third embodiment of the present invention as viewed from the front.
Figure 13:
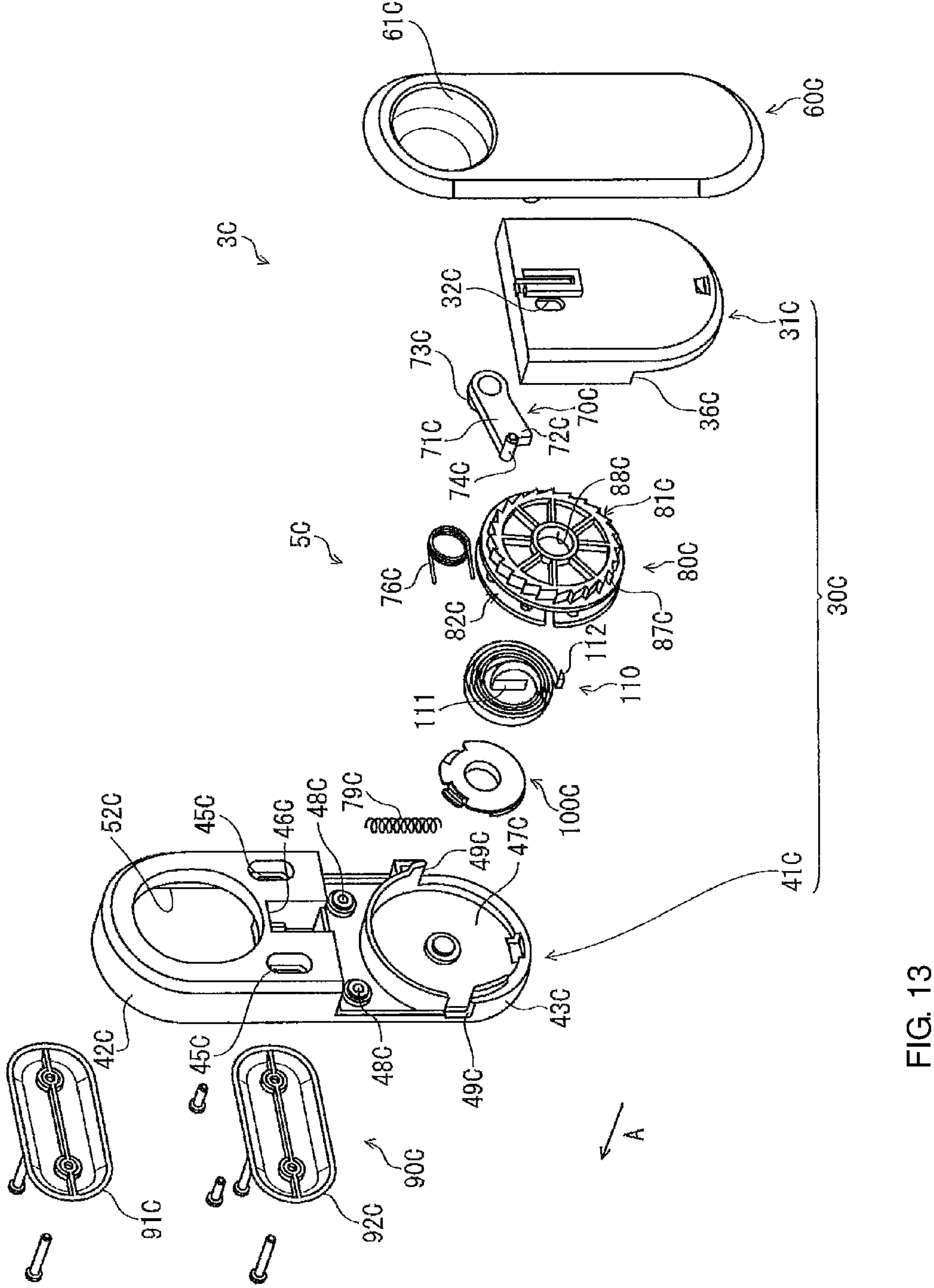
FIG. 13 is an exploded perspective view of the adjustment mechanism according to the third embodiment of the present invention as viewed from the back.
Figure 14:
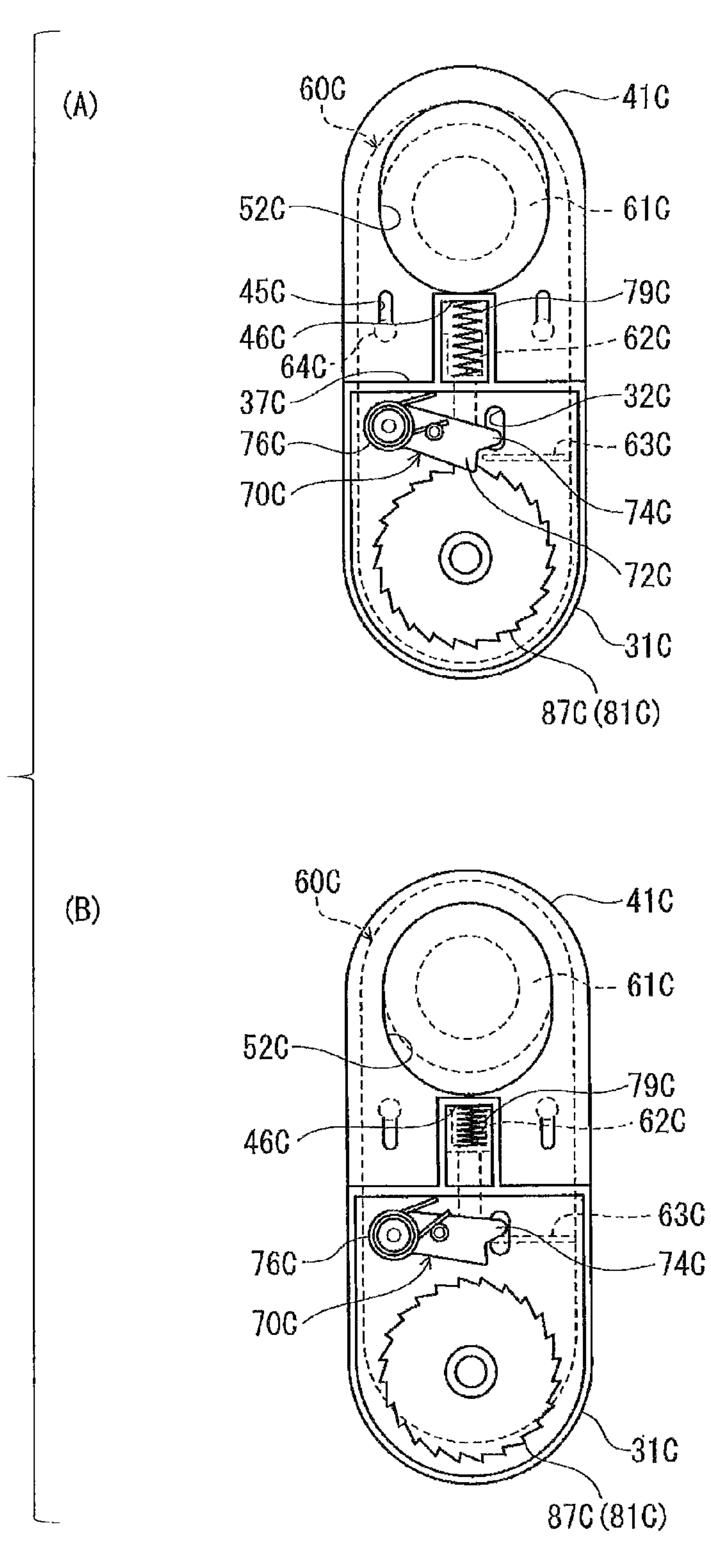
FIG. 14 illustrates the relationship among an unlock member, reel, and lock member of the adjustment mechanism, where

An adjustment mechanism 3C according to a third embodiment will be described with reference to FIGS. 10 to 14. Only differences from the adjustment mechanism 3 illustrated in the first embodiment will be described in detail. In the following description, the upper side of FIGS. 10 to 14 is the upper side of the adjustment mechanism 3C, and the lower side of FIGS. 10 to 14 is the lower side of the adjustment mechanism 3C. In the description of the adjustment mechanism 3C of the third embodiment as well, the forward direction is the direction shown by arrow A in FIGS. 10 to 13, and the rearward direction is the opposite direction thereto. In FIG. 14, in order to facilitate understanding, an unlock member 60C is shown by dashed lines, and the other members are shown by solid lines.

The adjustment mechanism 3C generally includes the cord 4 and an adjustment mechanism body 5C. Referring particularly to FIG. 12, the adjustment mechanism body 5C includes a holder 30C, an unlock member 60C, a lock member 70C, a reel 80C, and the biasing member 110. The thickness (dimension in the front-rear direction) of the adjustment mechanism body 5C is preferably small, specifically 5 cm or less, more preferably 3 cm or less.

The holder 30C is attached to the back surface of the backrest portion 11. The holder 30C preferably houses the lock member 70C and the reel 80C inside so that the lock member 70C and the reel 80C are not exposed to the outside. For example, the holder 30C has a flat shape that is long in the up-down direction and extends along the back surface of the backrest portion 11. Specifically, the dimension in the up-down direction of the holder 30 is longer than the dimension in the lateral direction of the holder 30. For example, the dimension in the up-down direction of the holder 30 is designed to be twice or more, preferably three times or more, the dimension in the lateral direction of the holder 30. The holder 30C is divided into front or rear parts (a part on the backrest portion 11 side and a part on the side rearward of the backrest portion 11), and includes a rear holder 31C and a front holder 41C.

As shown in FIG. 12, the rear holder 31C includes a rear surface and side surfaces protruding forward from the outer peripheral edge of the rear surface. A guide hole 32C, first and second protrusions 33C, 34C, and a third protrusion 35C are provided in a region surrounded by the rear surface and side surfaces of the rear holder 31C. The guide hole 32C is a long hole extending through the rear surface and extending in the up-down direction. A protruding portion 74C of the lock member 70C that will be described later extends through the guide hole 32C, and the guide hole 32C guides movement in the up-down direction of the protruding portion 74C. The first protrusion 33C protrudes forward from the rear surface, and holds a support portion 73C and a torsion spring 76C of the lock member 70C that will be described later. The first protrusion 33C thus also functions as a rotating shaft for the rock member 70C. The first protrusion 33C has a screw hole in the center in which a screw 94C is fastened. Like the first protrusion 33C, the second protrusion 34C has a screw hole in the center in which a screw 96C is fastened. The third protrusion 35C extends through a reel through hole 88C of the reel 80C that will be described later. The third protrusion 35C has in its upper end a slit in which the one end 111 of the biasing member 110 is fixed. The side surface has first stepped portions 36C facing each other in the left-right direction.

The front holder 41C extends along the back surface of the backrest portion 11. As shown in FIG. 13, the front holder 41C includes an upper region 42C and a lower region 43C. The upper region 42C holds the unlock member 60C that will be described later, and the lower region 43C holds the rear holder 31C. The lock member 70C, the reel 80C, and the biasing member 110, which will be described later, are housed in the space formed by the lower region 43C of the front holder 41C and the rear holder 31C.

As shown in FIG. 12, the upper region 42C includes a large hole 52C, a pair of screw holes 44C located above the large hole 52C, a pair of long holes 45C located below the large hole 52C, and a spring-upper-end holding portion 46C located between the pair of long holes 45C. An operation portion 61 of the unlock member 60C that will be described later is inserted through the large hole 52C. Referring also to FIG. 14, the large hole 52C is set to be larger than the dimension in the up-down direction of the operation portion 61C so as to allow the operation portion 61C to slide up and down to some extent. A pair of screws 95C (FIG. 12) is passed through the pair of long holes 45C and fastened in through holes 64C of the unlock member 60C. The unlock member 60C is thus fixed to the front holder 41C in such a manner that the unlock member 60C is slidable in the up-down direction. The upper end of the spring-upper-end holding portion 46C contacts the upper end of a coil spring 79C.

As shown in FIG. 13, the lower region 43C includes a reel holding portion 47C for holding the reel 80C that will be described later, and a pair of screw holes 48C. A side surface of the lower region 43C has second stepped portions 49C facing each other in the left-right direction. As shown particularly in FIG. 11(B), through holes 50C for passing the cord 4 therethrough are formed by the first stepped portions 36C of the rear holder 31C and the second stepped portions 49C of the front holder 41C. The through holes 50C are thus formed at a lower position in the holder 30C. Specifically, the through holes 50C are provided below the middle position in the up-down direction of the holder 30C.

The holder 30C may be attached to a back plate of the backrest portion 11 via a plate 90C. The plate 90C has, for example, a horizontally elongated rectangular shape, and includes an upper plate 91C located at an upper position and a lower plate 92C located at a lower position. As shown particularly in FIG. 12, each of the upper and lower plates 91C, 92C has a pair of holes. Screws 93C are passed through the pair of holes of the upper plate 91C, and the screws 93C are fastened in the screw holes 44C of the front holder 41C. The screw 94C is passed through the left hole of the lower plate 92C in the figure, and the screw 94C is also passed through one of the screw holes 48C in the lower region 43C of the front holder 41C and fastened in the screw hole of the first protrusion 33C of the rear holder 31C. The screw 96C is passed through the right hole of the lower plate 92C in the figure, and the screw 96C is also passed through the other screw hole 48C in the lower region 43C of the front holder 41C and fastened in the screw hole of the second protrusion 34C of the rear holder 31C.

The method for attaching the adjustment mechanism 3C to the backrest portion 11 is not limited. For example, a hook may be fixed to the upper edge of the front holder 41C, and the adjustment mechanism 3C may be hooked to an inverted U-shaped pipe that forms the backrest portion 11. Various attachment methods are thus used depending on the shape of the backrest portion 11.

As shown in FIGS. 12 and 13, the reel 80C is formed by stacking a ratchet 81C and a cord holding portion 82C together. The racket 81C and the cord holding portion 82C are provided integrally and rotate together. The rotation axis of the reel 80C is perpendicular to the back surface of the backrest portion 11. The term "perpendicular" herein does not necessarily mean exactly 90 degrees to the tilt angle of the backrest portion 11, and includes substantially perpendicular to (e.g., tilted about 70 degrees to 110 degrees with respect to) the back surface of the backrest portion 11. The ratchet 81C faces toward the rear holder 31C, and the cord holding portion 82C faces toward the front holder 41. The ratchet 81C includes the one-way clutch mechanism described above. The ratchet 81C has engaging teeth 87C arranged in the circumferential direction, and engages or is engaged with the lock member 70C that will be described later.

As shown particularly in FIG. 12, the cord holding portion 82C includes a flange 84C and includes in its central portion a recessed portion 83C for housing the biasing member 110 and a cord guide 100C. The flange 84C has a pair of slits 86C at opposing positions (i.e., positions that are 180 degrees away from each other). The pair of slits 86C serve to guide the cord 4 out of the holder 30C.

The recessed portion 83C has in its central portion a reel through hole 88C through which the third protrusion 35C of the rear holder 31C extends. The biasing member 110 housed in the recessed portion 83C has its one end portion 111 fixed to the third protrusion 35C of the rear holder 31C and the other end portion 112 fixed to a notch 85C formed in the flange 84C of the cord holding portion 82C. The reel 80C is thus always biased in the wind-up direction by the biasing member 110.

The cord guide 100C is housed in the recess 83C and disposed above the biasing member 110. The cord guide 100C is a member that guides the cord 4 along its path. The cord guide 100C serves not only to guide the cord 4 but also to fix the position of the cord 4 inside the reel 80C. The use of the cord guide 100C eliminates the need to tie and fix the cord 4 inside the reel 80C and therefore reduces the thickness in the front-rear direction of the adjustment mechanism 3C.

As shown in FIG. 12, the lock member 70C is mounted so as to be displaceable within the thickness of the reel 80C. That is, it is preferable that the dimension in the front-back direction of the lock member 70C is smaller than the dimension in the front-back direction of the reel 80C. Specifically, the lock member 70C includes the lock body 71C and the torsion spring 76C. The lock body 71C includes: an engaging pawl 72C located at its one end; the protruding portion 74C protruding toward the rear holder 31C and extending through the guide hole 32C of the rear holder 31C; the support portion 73C located at the other end of the lock body 71C and supported by the first protrusion 33C of the rear holder 31C; and a positioning portion 75C for positioning the torsion spring 76C. The positioning portion 75C holds the other end portion 78C of the torsion spring 76C. One end portion 77C of the torsion spring 76C contacts an upper edge portion 37C of the rear holder 31C. The lock member 70C is therefore biased in a lock direction (direction in which the lock member 70C engages with the engaging tooth 87C). The lock member 70C is mounted so as to be displaceable in the radial direction of the reel 80C, so that the engaging pawl 72C engages with and disengages from the engaging tooth 87C of the ratchet 81C.

Figure 11:
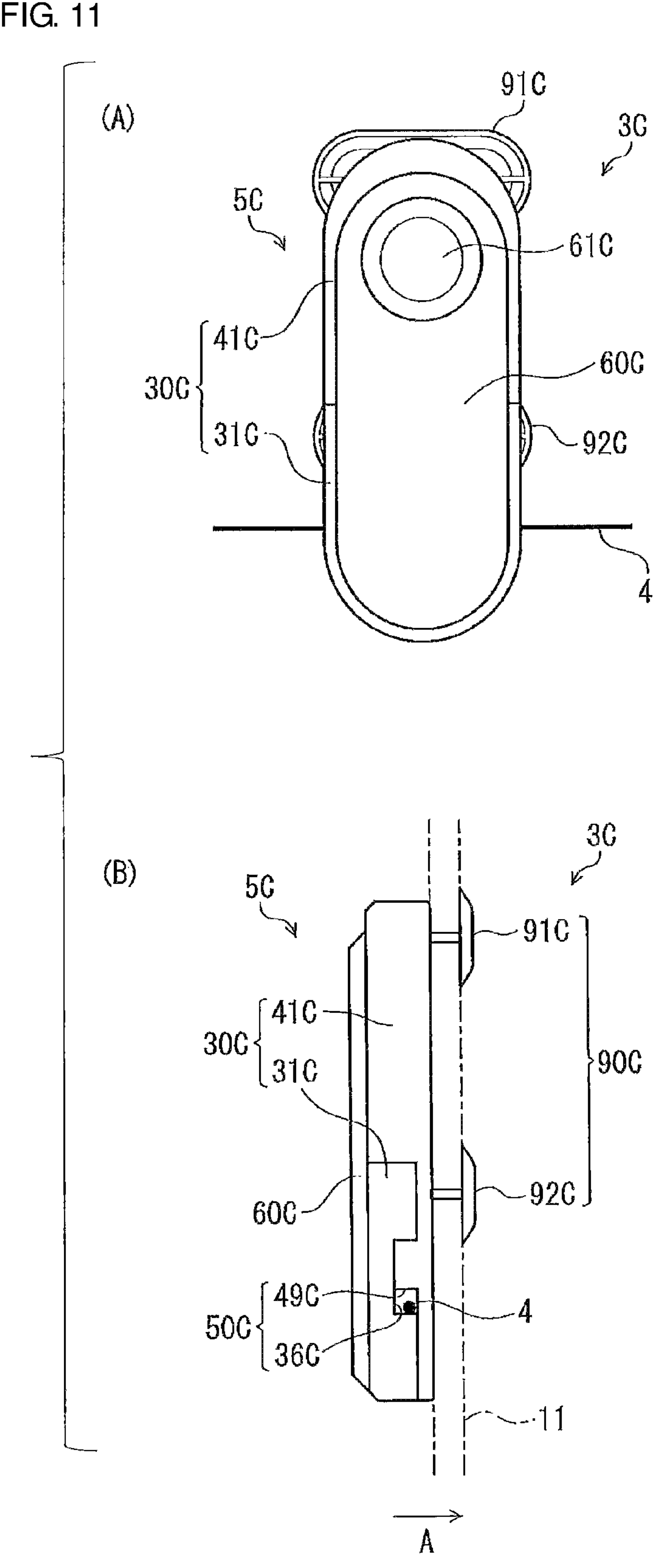
FIG. 11 illustrates an adjustment mechanism according to the third embodiment of the present invention, where

As shown in FIGS. 11 to 13, the unlock member 60C is mounted so as to be displaceable in a parallel relationship to the back surface of the backrest portion 11. The unlock member 60 also extends in a parallel relationship to the front holder 41C. The term “parallel” herein is not necessarily intended to mean exactly parallel, but includes a slightly tilted positional relationship with respect to the front holder 41C. The unlock member 60C has a shape elongated in the up-down direction, and may have substantially the same length in the up-down direction of the adjustment mechanism 3C. The unlock member 60C has the operation portion 61C at an upper position. The operation portion 61C has a recessed shape recessed forward, and preferably has, for example, a circular shape so that it can be easily hooked with a finger. The lock member 70C and the ratchet 81C can be released from the locked state by inserting a figure into the operation portion 61C and sliding the operation portion 61C upward. The operation portion 61C is located inside the large hole 52C of the front holder 41C.

The unlock member 60C includes, on its front surface, a spring-lower-end holding portion 62C located below the operation portion 61C and in contact with the lower end of the coil spring 79C, a contact portion 63C located below the spring-lower-end holding portion 62C and in contact with the protruding portion 74C of the lock member 70, and the pair of screw holes 64C located on both sides of the spring-lower-end holding portion 62C.

The spring-lower-end holding portion 62C together with the spring-upper-end holding portion 46C of the front holder 41C described above holds the coil spring 79C. Therefore, the unlock member 60C is always biased downward by the coil spring 79C. Since the contact portion 63C is in contact with the protruding portion 74C of the lock member 70C, moving the unlock member 60C upward rotates the lock member 70C upward.

As a specific operation, a finger is inserted into the operation portion 61C of the unlock member 60C in the state shown in FIG. 14(A), and the unlock member 60C is moved upward. Since the protruding portion 74C of the lock member 70C is in contact with the contact portion 63C of the unlock member 60C, the lock member 70C is rotated upward against the biasing force of the torsion spring 76C, as shown in FIG. 14(B). As a result, the engaging tooth 87C of the ratchet 81C and the engaging pawl 72C of the lock member 70C are disengaged from each other. When the finger is released from the operation portion 61C, the engaging tooth 87C of the ratchet 81C and the engaging pawl 72C of the lock member 70C are engaged with each other as shown in FIG. 14(A) because the unlock member 60C is always biased downward by the coil spring 79C.

The adjustment mechanism 3C of the present embodiment is disposed such that the rotation axis of the reel 80C is perpendicular to the back surface of the backrest portion 11, the lock member 70C is mounted so as to be displaceable in the radial direction of the reel 80C, and the unlock member 60C is mounted so as to be displaceable in a parallel relationship to the back surface of the backrest portion 11. The adjustment mechanism 3C can thus be made compact, and particularly its thickness in the front-rear direction can be reduced. Since the reel 80C and the lock member 70C are mounted as described above, the thickness in the front-rear direction of the adjustment mechanism 3C is not increased even when the diameter of the reel 80 is increased. Moreover, since the lock member 70C is mounted so as to be displaceable within the thickness of the reel 80C, the thickness of the adjustment mechanism 3C can further be reduced.

In the adjustment mechanism 3C of the present embodiment, since the through holes 50C through which the cord 4 is pulled out are formed at a lower position in the holder 30C, the cord 4 is pulled out horizontally and no unnecessary tension is applied to the cord 4. Moreover, since the operation portion 61C of the unlock member 60C is located at an upper position in the holder 30C, a hand can be placed on the operation portion 11 at the same time as when the hand is placed on the upper part of the back surface of the backrest portion 11. This allows the backrest portion 11 to be raised or reclined with the operation portion 60C moved upward, which provides high operability.

In the adjustment mechanisms 3, 3A, 3B, and 3C of the first to third embodiments, the lock member 70, 70A, 70B, 70C and the reel 80, 80A, 80C are housed in the holder 30, 30A, 30C. This can prevent malfunction due to entry of foreign matter etc. Moreover, these adjustment mechanisms can be attached to the back surface of the backrest portion 11. Therefore, these adjustment mechanisms can be easily attached at the time of manufacturing, and can be easily removed for repair, etc. Moreover, these adjustment mechanisms can be attached to various vehicle body frames, which provides high flexibility.

Although the holders 30, 30A of the first and second embodiments are divided into upper and lower parts and the holder 30C of the third embodiment is divided into front and rear parts, the shape of the holder is not limited to these.

In particular, in the adjustment mechanism 3C of the third embodiment, the reel 80C and the lock member 70C are housed between the front holder 41C and the rear holder 31C. However, the rear holder 31C may be omitted. For example, the reel 80C and the lock member 70C need only be located between an inner plate portion extending along the back surface of the backrest portion 11 (e.g., the front holder 41C) and an outer plate portion extending in a parallel relationship to the inner plate portion and serving as the unlock member 60C. This configuration allows the adjustment mechanism 3C to have a flat shape with a small thickness in the front-rear direction.

The force of the backrest portion trying to move downward may include not only the weight of the backrest portion itself but also the biasing force of a spring etc. that tries to move the backrest portion downward.

In the embodiments, the unlock member 60, 60A, 60B, 60C and the lock member 70, 70A, 70B, 70C are separate members. However, the unlock member 60, 60A, 60B, 60C and the lock member 70, 70A, 70B, 70C may be a single-piece member.

The biasing force of the biasing member 110 is set to be smaller than the biasing force of the backrest portion 11 trying to move downward. However, the biasing force of the biasing member 110 may be set to be equal to this biasing force or larger than this biasing force. The adjustment mechanisms 3, 3A, and 3C may not include the biasing member 110, and the reels 80, 80A, and 80C may be manually rotated to wind up the cord 4.

Although the embodiments of the present invention are described above with reference to the drawings, the present invention is not limited to the illustrated embodiments. Various modifications and variations can be made to the illustrated embodiments within the scope that is the same as or equivalent to that of the invention.

REFERENCE SIGNS LIST

1: Stroller, 3, 3A, 3B, 3C: Adjustment Mechanism, 4: Cord, 10: Seat Surface Portion, 11: Backrest Portion, 30, 30A, 30C: Holder, 41C: Front Holder (Inner Plate Portion), 50C: Through Hole, 60, 60A, 60B, 60C: Unlock Member (Outer Plate Portion), 70, 70A, 70B, 70C: Lock Member, 72, 72C: Engaging Pawl, 80, 80A, 80C: Reel, 87, 87C: Engaging Tooth, 110: Biasing Member

The invention claimed is:

1. Child care equipment with a seat, the child care equipment comprising:

a body including a seat surface portion, a backrest portion standing upward from a rear end of the seat surface portion and having a changeable tilt angle with respect to the seat surface portion, and an adjustment mechanism configured to change the tilt angle of the backrest portion, wherein the adjustment mechanism includes;

a holder attached to a back surface of the backrest portion, a reel housed in the holder and supported by the holder so as to be rotatable in both forward and reverse directions, a cord connecting the body and the backrest portion and configured to change the tilt angle of the backrest portion as the reel winds up and lets out the cord, a lock member housed in the holder and configured not to allow rotation of the reel, wherein the lock member includes an engaging pawl that is displaceable between a first position where the lock member is engaged with a portion that rotates with the reel so as not to allow the rotation of the reel and a second position where the lock member is disengaged from the portion that rotates with the reel so as to allow the rotation of the reel, an operating unlock member configured to bring the lock member to the second position to allow the reel to rotate freely, a biasing member configured to bias the reel in a wind-up direction in which the reel winds up the cord so that the backrest can be raised, and a one-way clutch mechanism configured to allow rotation of the reel in the wind-up direction in which the reel winds up the cord and not to allow rotation of the reel in a unwind direction in which the reel lets out the cord so that the backrest portion moves downward.

2. The child care equipment with a seat according to claim 1, wherein:

a biasing force of the biasing member is selected to be smaller than a biasing force of the backrest portion trying to move downward.

3. The child care equipment with a seat according to claim 1, wherein:

the operating unlock member is located so as to protrude from a lateral side surface of the holder.

4. The child care equipment with a seat according to claim 1, wherein:

the biasing member is a spiral spring, and one end of the spiral spring is fixed to the reel, and the other end of the spiral spring is fixed to the holder.

5. The child care equipment with a seat according to claim 1, wherein:

the reel and the lock member are located between the holder and the operating unlock member, a rotation axis of the reel is perpendicular to the back surface of the backrest portion, the lock member is mounted so as to be displaceable between the first position and the second position in a radial direction of the reel, and the operating unlock member is mounted so as to be displaceable in a parallel relationship to the back surface of the backrest portion.

6. The child care equipment with a seat according to claim 5, wherein;

the lock member is mounted so as to be displaceable within a thickness of the reel.

7. The child care equipment with a seat according to claim 5, wherein:

the holder has a flat shape elongated in an up-down direction and extending along the back surface of the backrest portion, and has a through hole for passing the cord therethrough, the through hole is located at a lower position in the holder elongated in the up-down direction, and the operating unlock member has a shape elongated in the up-down direction and extending along the back surface of the backrest portion, and includes an operation portion located at an upper position in the operating unlock member.

8. The child care equipment with a seat according to claim 1, wherein;

the holder includes an inner plate portion extending along the back surface of the backrest portion, the operating unlock member includes an outer plate portion extending in a parallel relationship to the inner plate portion, and the reel and the lock member are located between the inner plate portion and the outer plate portion.

9. The child care equipment with a seat according to claim 1, wherein the lock member and the operating unlock member are connected so as to be relatively displaceable with respect to each other.

* * * * *